United States Patent
Tsuji et al.

(10) Patent No.: US 12,509,918 B2
(45) Date of Patent: Dec. 30, 2025

(54) WHEELED PLATFORM AND WHEELED PLATFORM LOCKING SYSTEM

(71) Applicant: TOYOTA BOSHOKU KABUSHIKI KAISHA, Aichi (JP)

(72) Inventors: Hiroshi Tsuji, Nagoya (JP); Fumitoshi Akaike, Miyoshi (JP); Hajime Takagi, Toyoake (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 40 days.

(21) Appl. No.: 18/607,845

(22) Filed: Mar. 18, 2024

(65) Prior Publication Data
US 2024/0328210 A1    Oct. 3, 2024

(30) Foreign Application Priority Data
Mar. 31, 2023 (JP) .................................. 2023-058058

(51) Int. Cl.
E05B 73/00 (2006.01)
E05B 17/00 (2006.01)

(52) U.S. Cl.
CPC .......... E05B 73/00 (2013.01); E05B 17/0041 (2013.01)

(58) Field of Classification Search
CPC .............................. E05B 73/00; E05B 17/0041
USPC ............................................................. 70/14
See application file for complete search history.

(56) References Cited

U.S. PATENT DOCUMENTS

| 7,404,605 | B2 * | 7/2008 | Inoue | B60N 2/366 297/378.13 |
| 7,494,187 | B2 * | 2/2009 | Inoue | B60N 2/366 297/378.13 |
| 8,276,968 | B2 * | 10/2012 | Imajo | E05C 3/24 296/65.03 |
| 9,297,188 | B2 * | 3/2016 | Mensch | B60N 2/366 |
| 11,161,432 | B2 * | 11/2021 | Noguchi | B60N 2/90 |
| 2009/0267389 | A1 * | 10/2009 | Otsuka | B60N 2/888 297/216.12 |
| 2010/0032976 | A1 * | 2/2010 | Yamashita | B60N 2/0155 296/24.3 |
| 2010/0109411 | A1 * | 5/2010 | Shinohara | B60N 2/01583 297/378.13 |
| 2010/0270823 | A1 * | 10/2010 | Iwasa | B60N 2/3013 296/66 |
| 2011/0043017 | A1 * | 2/2011 | Kokubo | B60N 2/309 297/337 |
| 2011/0169279 | A1 * | 7/2011 | Ishikawa | B60N 2/305 292/96 |
| 2014/0037371 | A1 * | 2/2014 | Mensch | B60N 2/01583 403/328 |

FOREIGN PATENT DOCUMENTS

JP    2605453    7/2000

* cited by examiner

*Primary Examiner* — Nathan Cumar
(74) *Attorney, Agent, or Firm* — GREENBLUM & BERNSTEIN, P.L.C.

(57) ABSTRACT

A wheeled platform includes: a guide member that guides a striker to a locking device and includes a contact surface to be in contact with a wall-shaped portion in a state where the striker is engaged with the locking device, the guide member being displaceable in directions orthogonal to the contact surface; and a spring that applies an elastic force to the guide member against a pressing force acting on the contact surface.

5 Claims, 13 Drawing Sheets

WHEELED PLATFORM AND WHEELED PLATFORM LOCKING SYSTEM

CROSS-REFERENCE TO RELATED APPLICATIONS

The present application claims the benefit of Japanese Patent Application No. 2023-058058 filed on Mar. 31, 2023 with the Japan Patent Office, the entire disclosure of which is incorporated in the present specification by reference.

BACKGROUND

The present disclosure relates to a wheeled platform that can be secured to a wall and the like, and relates to a wheeled platform locking system.

Wheeled platforms such as a wheeled platform disclosed in Japanese Utility Model Registration No. 2605453 cannot be secured to a wall and the like.

SUMMARY

In cases where a wheeled platform is provided with a locking device and is configured such that the wheeled platform can be secured to a wall and the like, when the wheeled platform is secured to the wall and the like, a large impact force may act on the wheeled platform and an article placed thereon. The present disclosure discloses examples of a wheeled platform and a wheeled platform locking system which are made in view of this and other considerations.

It is desirable that the wheeled platform engageable with a striker secured to a wall-shaped portion comprises at least one of the following elements, for example.

Specifically, the elements include: a base for an article to be placed thereon; a columnar post rising from the base; a locking device arranged in the post to be engageable with the striker in a manner such that the locking device holds the striker inside thereof; a guide member configured to guide the striker to an engagement portion of the locking device in a state where the post approaches the striker, the guide member comprising a contact surface configured to be in contact with the wall-shaped portion in a state where the striker is engaged with the locking device, the guide member being displaceable in directions orthogonal to the contact surface; and a spring configured to apply an elastic force to the guide member against a pressing force acting on the contact surface.

Thus, the guide member and the spring of the wheeled platform function as a shock absorber that absorbs an impact force generated when the wheeled platform is secured to the wall-shaped portion. This can inhibit a great impact force from acting on the wheeled platform and an article placed on the wheeled platform.

In addition, since the spring is configured to apply an elastic force to the wheeled platform in a direction in which the wheeled platform is moved away from the wall-shaped portion, the elastic force provides a function to assist in easy release of the wheeled platform engaged with the striker.

Furthermore, the guide member guides the striker to the engagement portion of the locking device. This ensures engagement of the striker with the locking device.

It should be noted that the wheeled platform may be configured as follows.

Specifically, it is desirable that the locking device and the guide member are arranged on a base side of a longitudinally intermediate portion of the post, each of the locking device and the guide member being at least one in number. This can enable the wheeled platform to be effectively secured.

Furthermore, it is desirable that the contact surface is arranged at a position so that the contact surface comes first into contact with the wall-shaped portion in a state where the post approaches the striker. This can ensure that the guide member and spring function as a shock absorber.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

Figure 1:
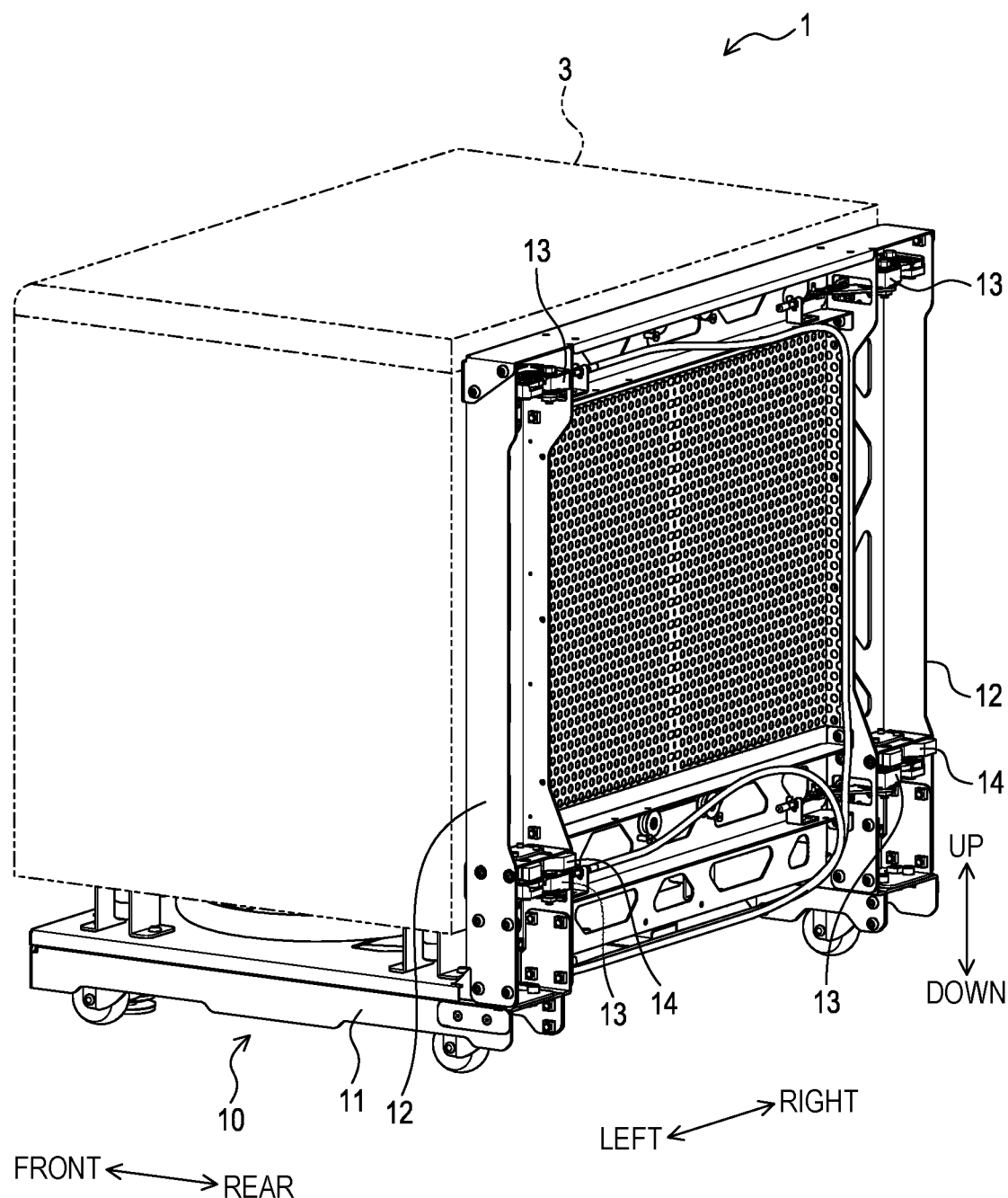
FIG. 1 is a diagram illustrating a wheeled platform according to a first embodiment.

Embodiments below show examples of embodiments belonging to the technical scope of the present disclosure. Invention-specifying matters and so on recited in the appended claims are not limited by specific configurations, structures, and the like indicated in the below-described embodiments.

Arrows indicating directions, hatched lines, and so on shown in the drawings are provided for the purpose of easier understanding of mutual relationships between the drawings, shapes of members or portions, and so on. Thus, the wheeled platform locking system disclosed in the present disclosure is not limited by the directions shown in the drawings.

A member or portion described at least with a reference numeral is at least one in number except in a case of being accompanied by restrictive words such as "only one". The wheeled platform locking system disclosed in the present disclosure comprises at least one of elements such as mem-

First Embodiment

<1. Overview of Wheeled Platform Locking System>

Figure 2:
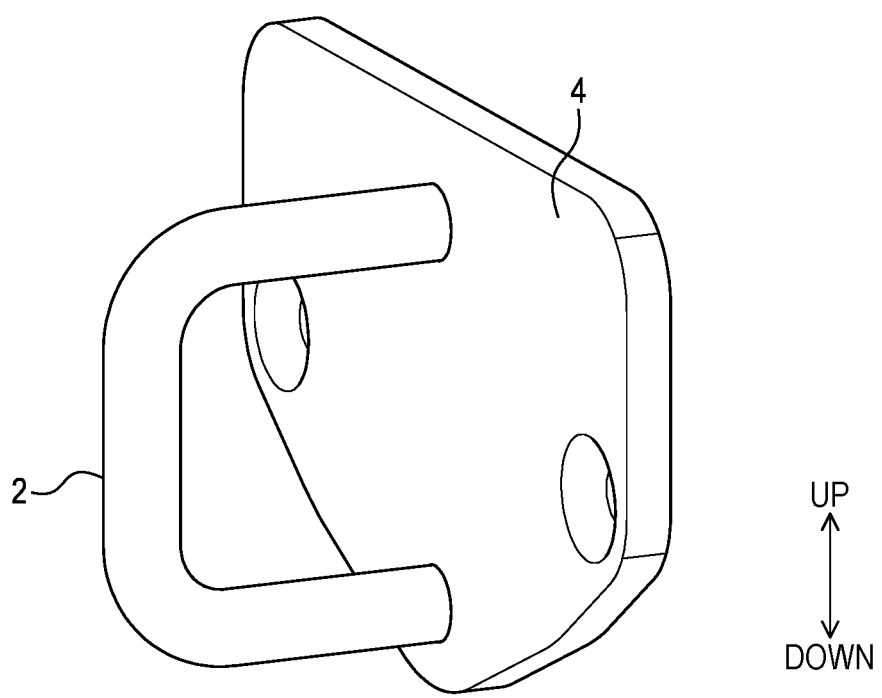
FIG. 2 is a diagram illustrating a striker.

A wheeled platform locking system 1 according to the present embodiment is a system that enables a wheeled platform 10 (see FIG. 1) to be engaged with a striker 2 (see FIG. 2). The striker 2 is an approximately C-shaped or angular C-shaped wire for engagement which is secured to a wall-shaped portion, such as an inner wall of a vehicle.

The striker 2 according to the present embodiment is secured to an inner wall and the like using a securing rail (not shown) such as Airline Rail (registered trademark). An article (for example, furniture or a fixture such as a refrigerator) 3 can be placed on the wheeled platform 10.

<2. Details of Wheeled Platform>

Figure 3:
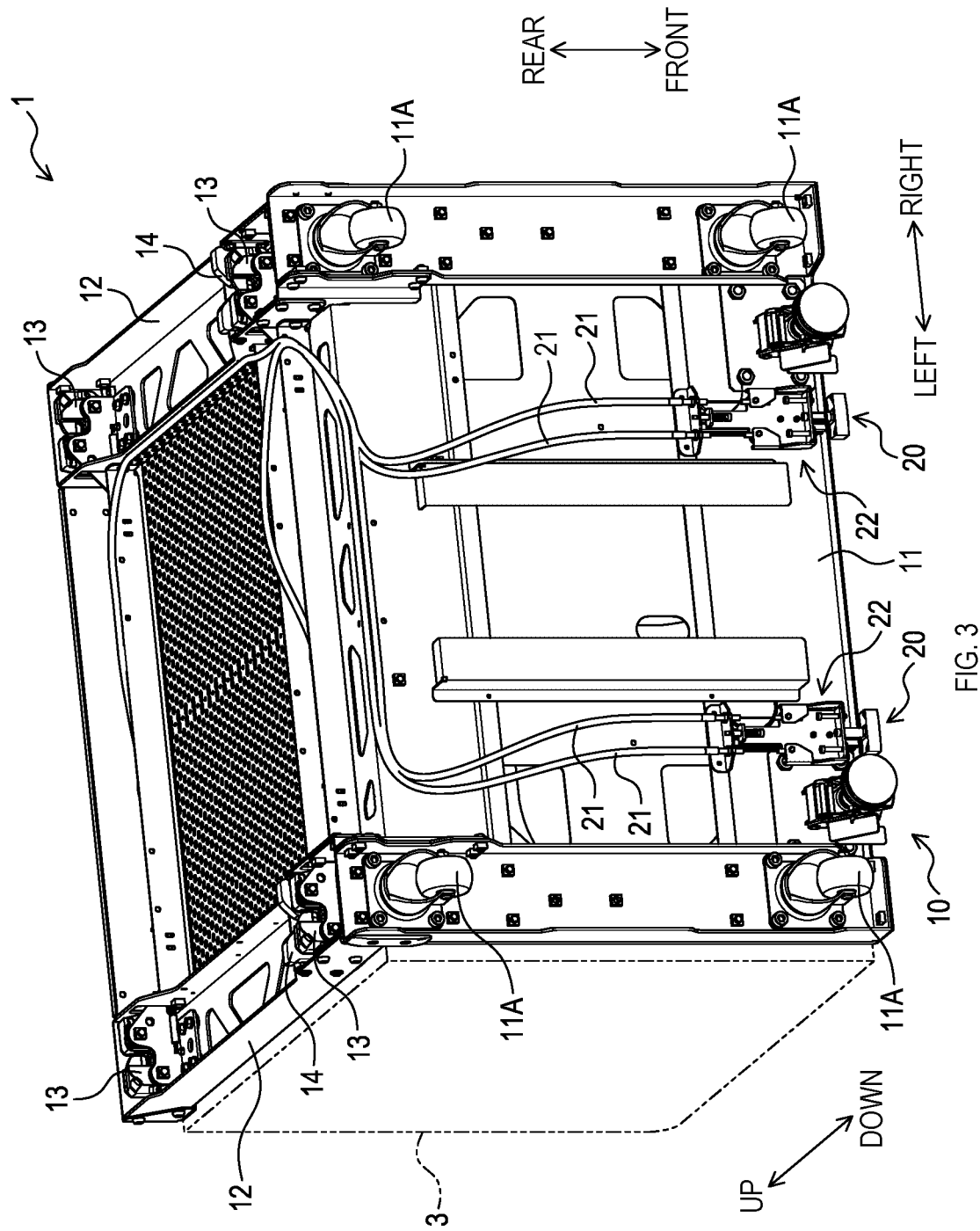
FIG. 3 is a diagram illustrating the wheeled platform according to the first embodiment.

As illustrated in FIG. 1, the wheeled platform 10 comprises at least a base 11, posts 12, locking devices 13, guide members 14, and unlocking devices 20 (see FIG. 3). The base 11 is a portion for the article 3 to be placed thereon. Two or more wheels 11A (see FIG. 3) are attached to the base 11.

As illustrated in FIG. 3, the base 11 according to the present embodiment is formed in an approximately rectangular plate shape. The wheels 11A are arranged at positions corresponding to four corners of the base 11. Each wheel 11A comprises a so-called "caster".

As illustrated in FIG. 1, the post 12 is a columnar member rising from the base 11. In the present embodiment, the post 12 is arranged at each of two corners of the base 11. Each post 12 is formed such that a cross-section thereof has an approximately angular C-shape or approximately C-shape open in a rear side (see FIG. 4).

In this description, a portion of the wheeled platform 10 in which the two posts 12 are arranged is referred to as "rear side" as illustrated in FIG. 1. An opposite side of the wheeled platform 10 from the rear side across the article 3 is referred to as "front side".

<2.1 Locking Device>

Figure 5:
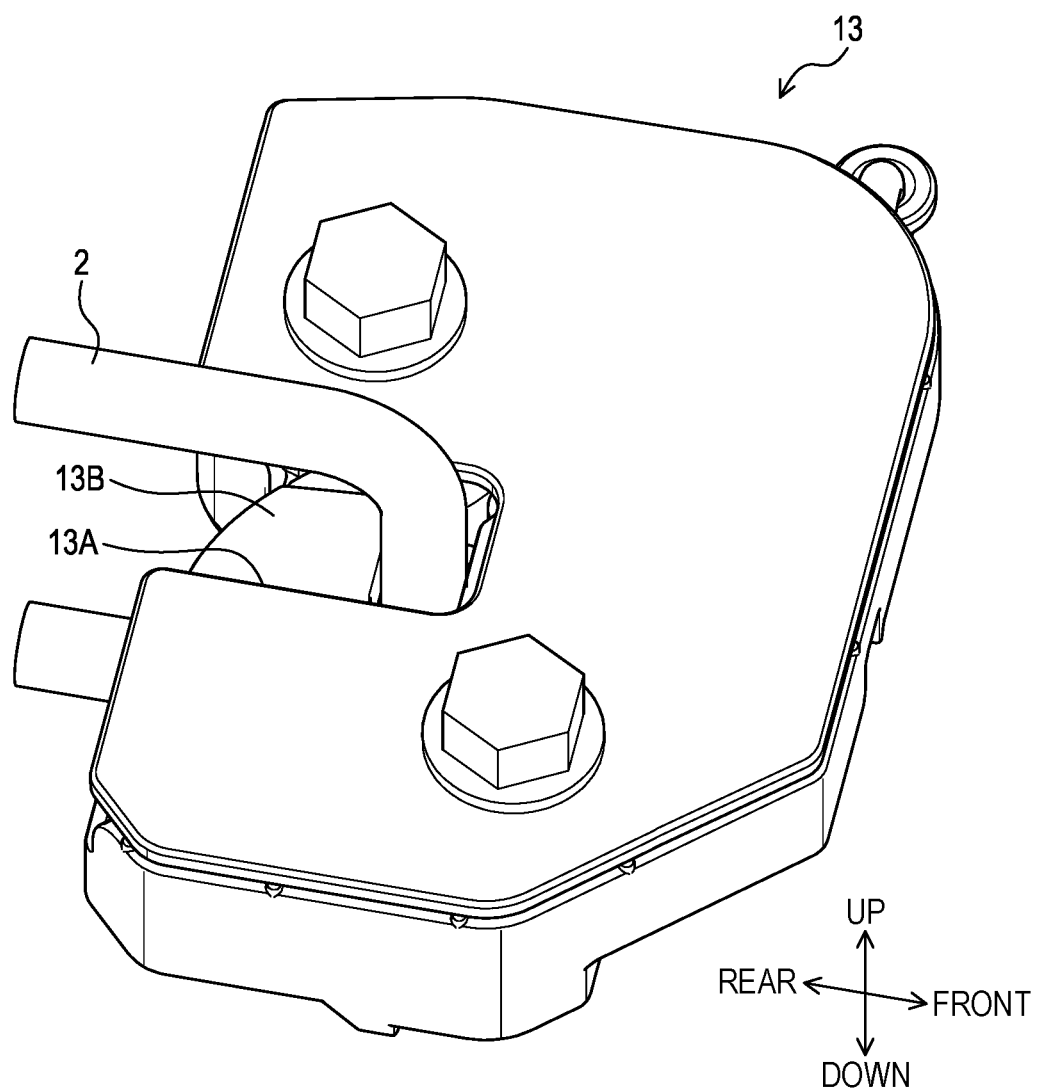
FIG. 5 is a diagram illustrating a locking device and other components according to the first embodiment.

The locking device 13 is a device engageable with the striker 2 in a manner such that the locking device 13 holds the striker 2 inside thereof. Specifically, the locking device 13 comprises a recess 13A and a latch 13B as illustrated in FIG. 5.

The recess 13A is a portion in which the striker 2 is to be fitted. The latch 13B is a locking bar that stops, in an engaged manner, the striker 2 fitted in the recess 13A. When the unlocking device 20 is operated, the latch 13B and the striker 2 are disengaged.

In other words, the locking device 13 can be switched between a locking state where the striker 2 and the latch 13B are engaged, and a non-locking state where the locking state is released. In the locking state and the non-locking state, positions of the latch 13B are different.

As illustrated in FIG. 1, at least one locking device 13 is arranged on each post 12. In the present embodiment, the locking devices 13 are arranged on the upper-end side and the lower-end side of each post 12.

Particularly, the locking device 13 arranged on the lower-end side of each post 12 is situated on a base 11 side of a longitudinally intermediate portion of the post 12. Each locking device 13 is housed in the post 12 (see FIG. 4).

<2.2 Guide Member>

Figure 6:
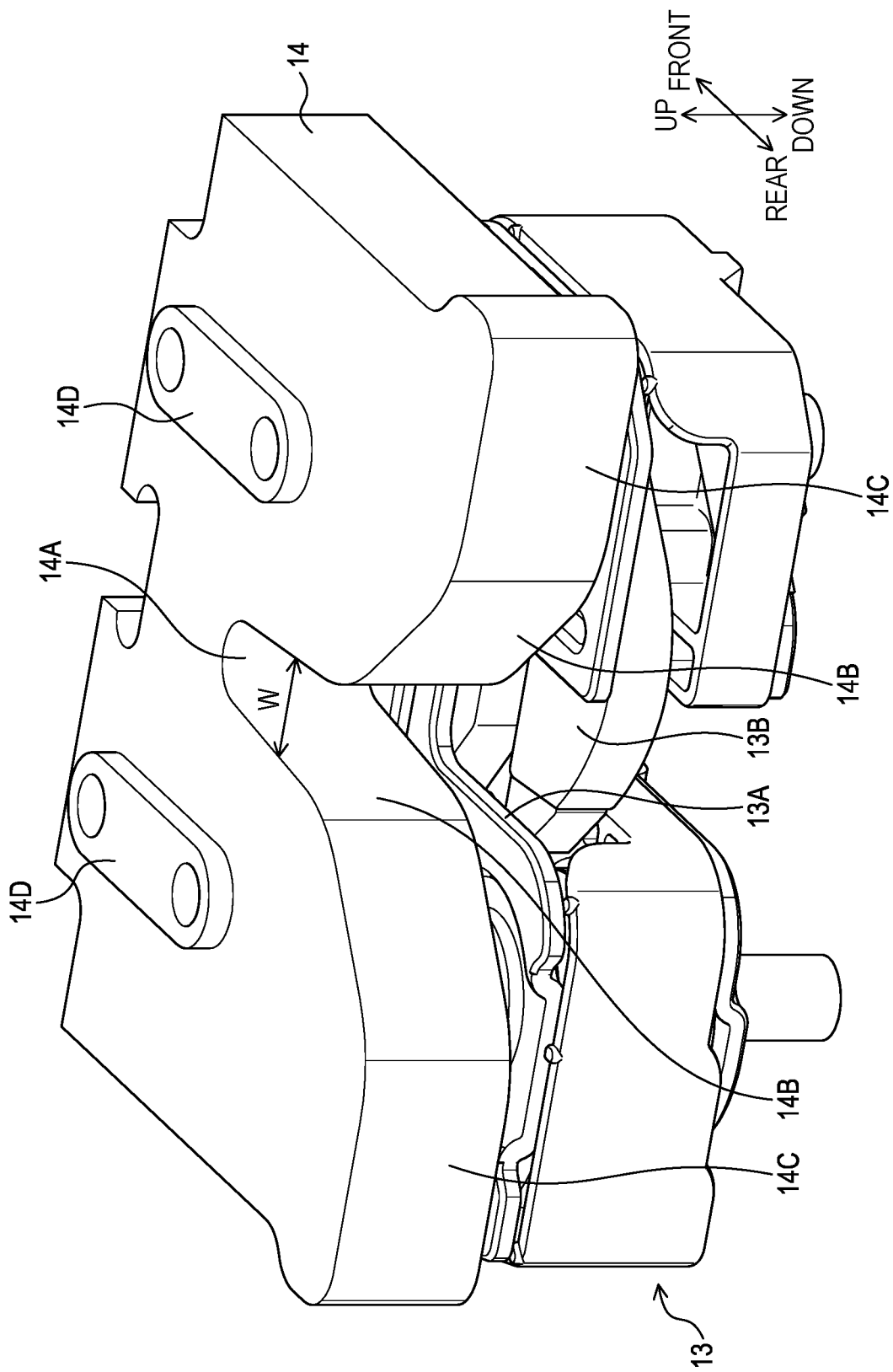
FIG. 6 is a diagram illustrating a locking device, a guide member, and other components according to the first embodiment.

As illustrated in FIG. 6, the guide member 14 is arranged close to the locking device 13. The guide member 14 guides the striker 2 to a portion of the recess 13A in which the striker 2 can be engaged with the latch 13B (hereinafter, this portion is also referred to as "engagement portion").

Figure 7:
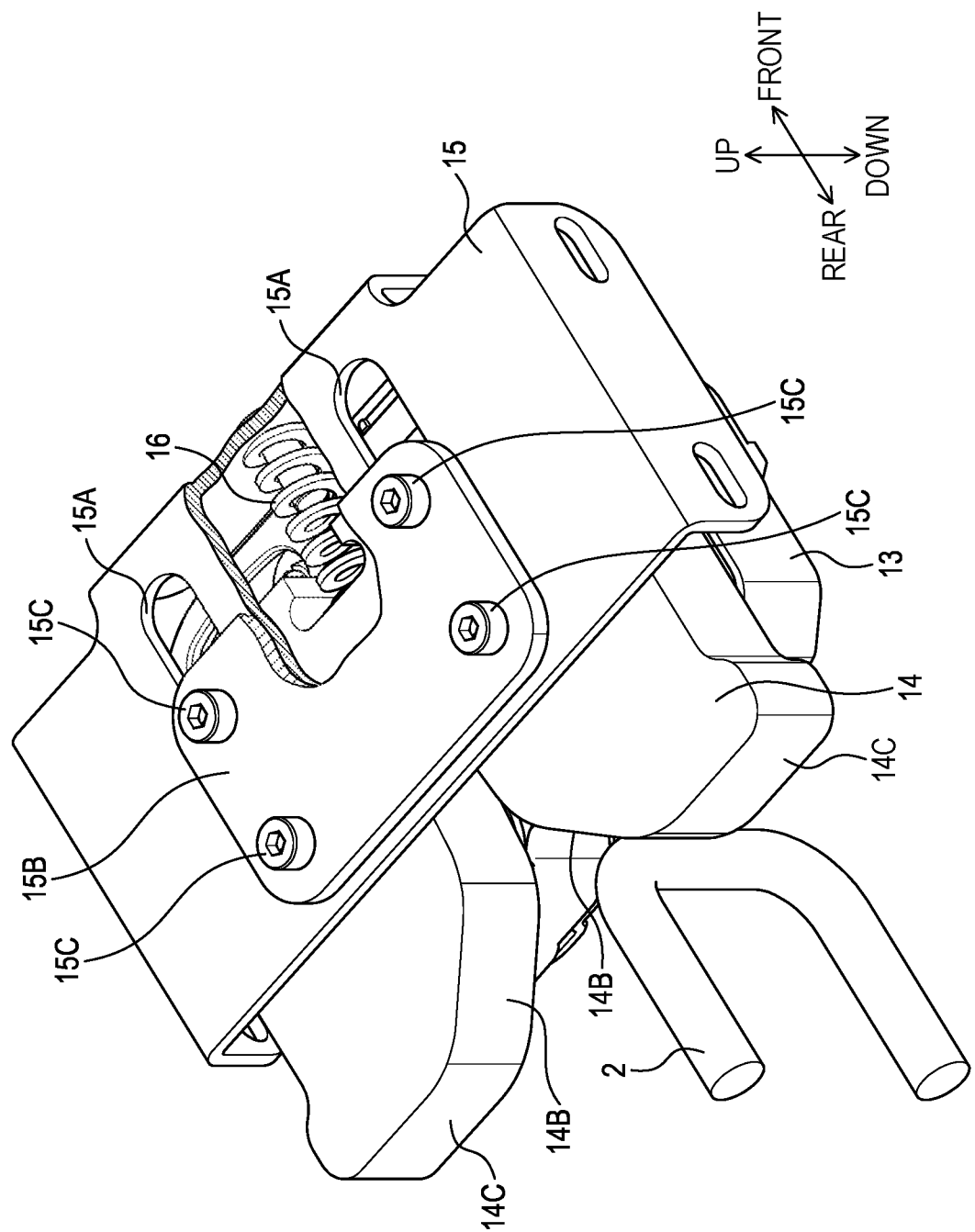
FIG. 7 is a diagram illustrating the locking device, the guide member, and other components according to the first embodiment.

Specifically, the guide member 14, as illustrated in FIG. 7, makes a sliding contact with the striker 2 and introduces the striker 2 into the engagement portion of the locking device 13 when the post 12 approaches the striker 2.

For this purpose, the guide member 14 is provided with a recess 14A for guiding the striker 2 thereinto as illustrated in FIG. 6. The recess 14A is a portion indented from a rear end of the guide member 14 toward the front side.

The guide member 14 is also provided with inclined surfaces 14B in an open side of the recess 14A, that is in a rear-end side of the guide member 14. The inclined surfaces 14B are portions inclined relative to a normal direction of contact surfaces 14C so that a width W of the opening decreases toward the front side.

Figure 9:
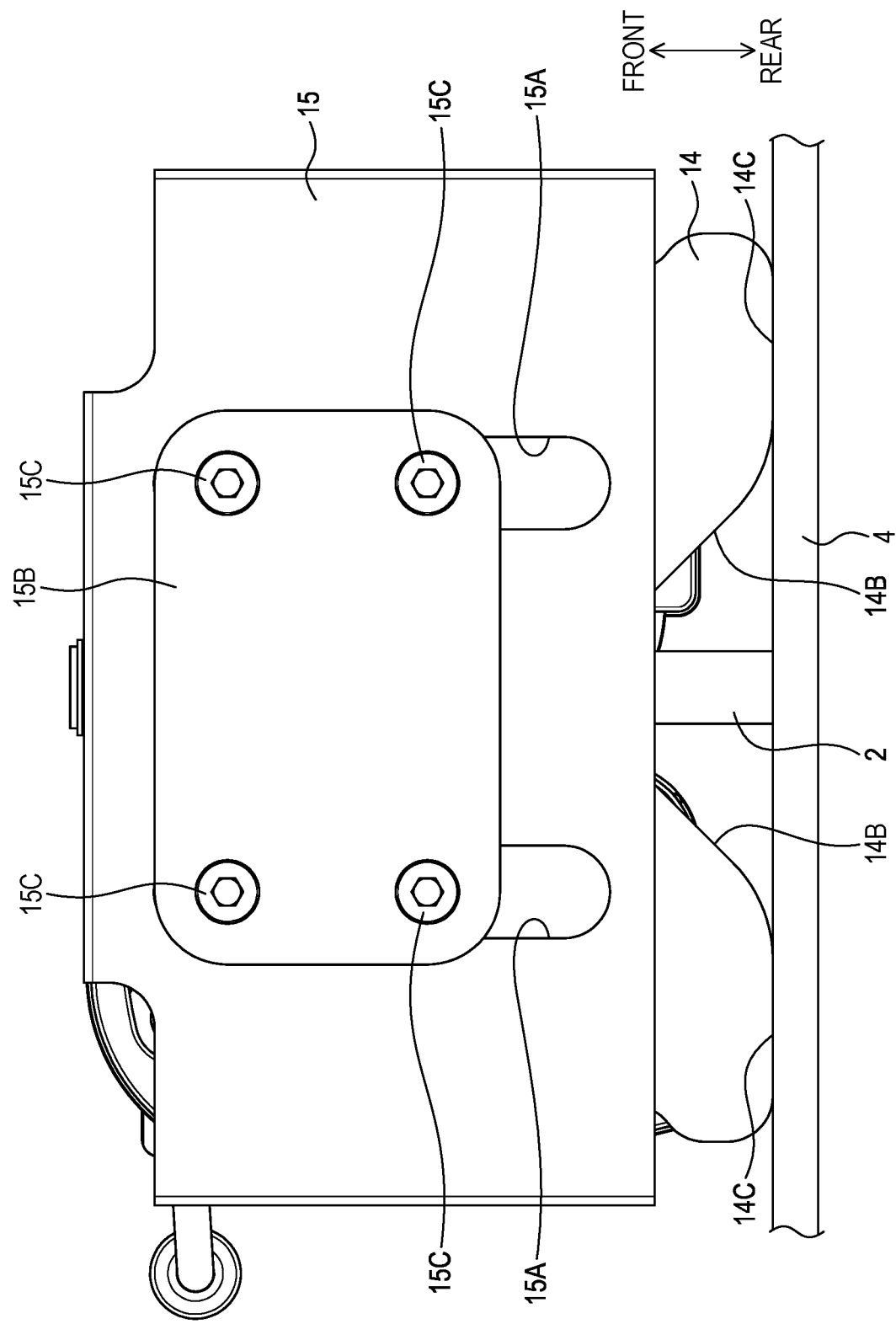
FIG. 9 is a diagram illustrating the locking device, the guide member, and other components according to the first embodiment.

The guide member 14 is provided with the contact surfaces 14C at the rear end thereof, that is in the open side of the recess 14A. As illustrated in FIG. 9, the contact surfaces 14C come into contact with the wall-shaped portion 4 (hereinafter, referred to as "wall 4") when the striker 2 is engaged with the locking device 13.

Figure 8:
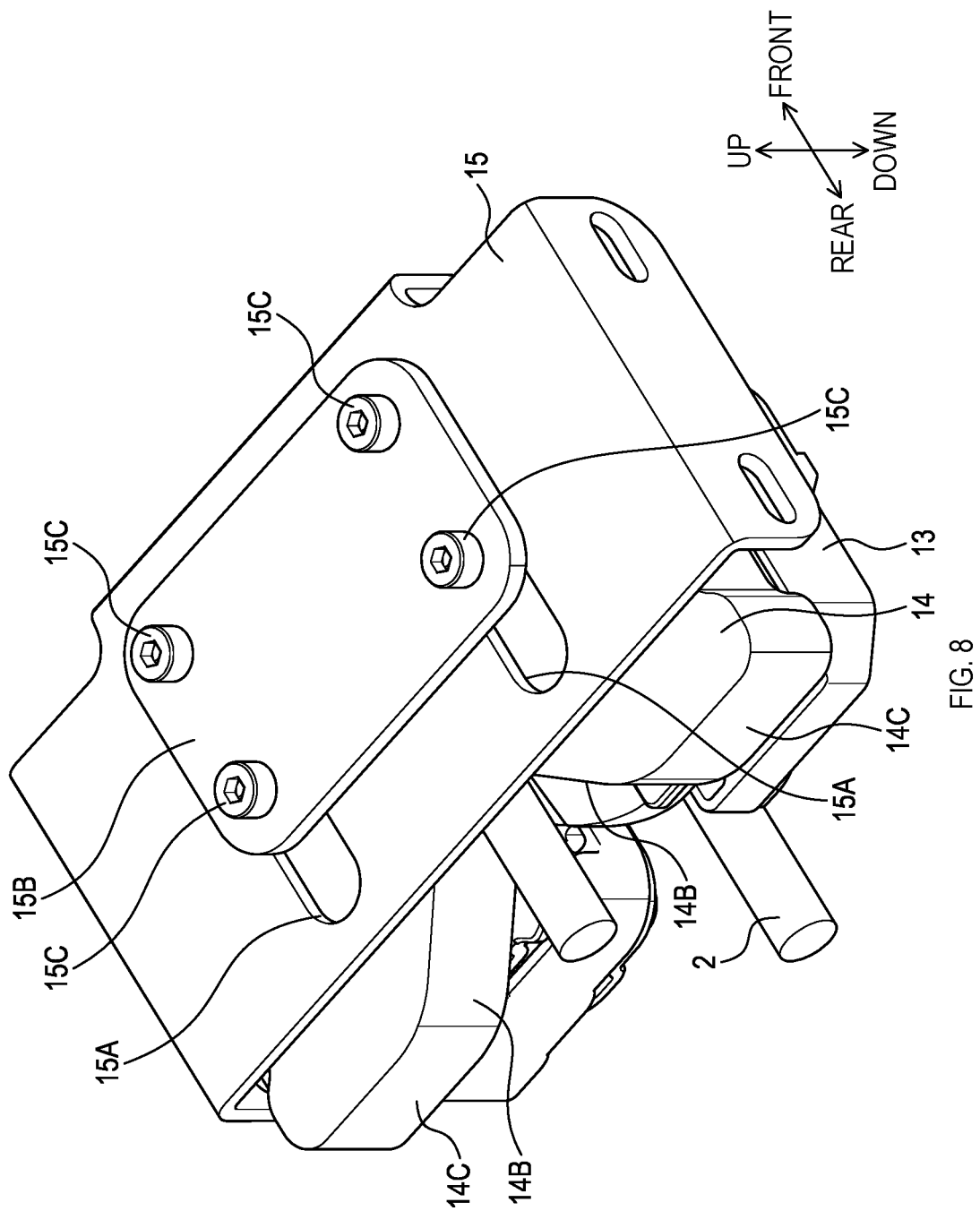
FIG. 8 is a diagram illustrating the locking device, the guide member, and other components according to the first embodiment.

As illustrated in FIGS. 7 and 8, the guide member 14 is displaceable in directions orthogonal to the contact surfaces 14C (in front-rear directions in the present embodiment) with respect to the locking device 13 secured to the post 12.

Figure 4:
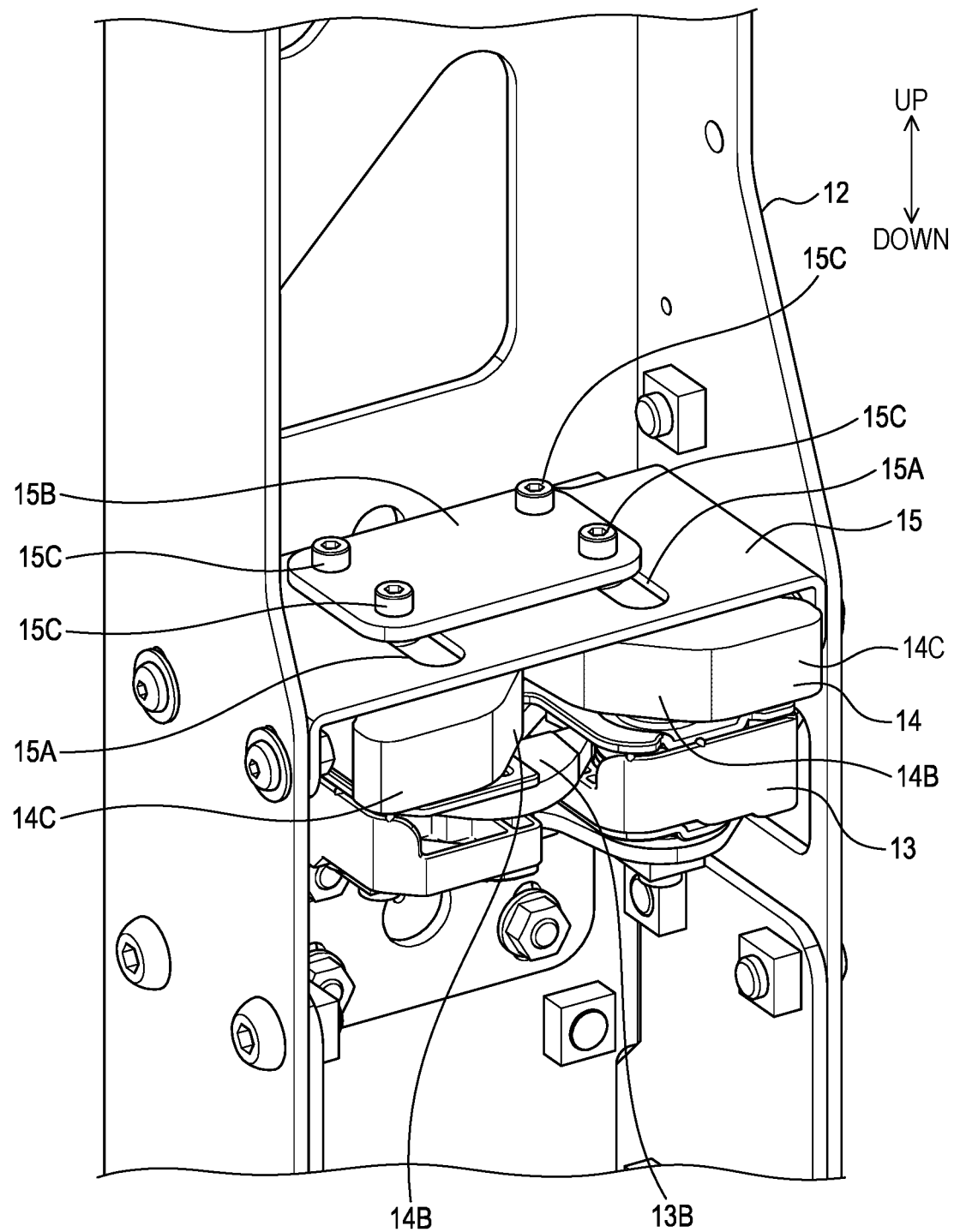
FIG. 4 is a diagram illustrating a locking device, a guide member, and other components according to the first embodiment.

Specifically, as illustrated in FIG. 4, the guide member 14 is displaceably supported by a bracket 15. That is, the bracket 15 is secured to the post 12. The bracket 15 is provided with elongated holes 15A.

A major-axis direction of the elongated hole 15A corresponds to the displacement directions of the guide member 14. In the elongated hole 15A, a boss 14D (see FIG. 6) provided on the guide member 14 is slidably fitted. The boss 14D is a protrusion projecting from a wall surface of the guide members 14.

Furthermore, as illustrated in FIG. 4, a plate 15B is arranged on an opposite side of the bracket 15 from the guide member 14, in other words on an upper surface of the bracket 15. The plate 15B is fastened to the guide member 14 by bolts 15C.

Thus, the bracket 15 is interposed between the plate 15B and the guide member 14. As the bosses 14D are slidingly displaced within the elongated holes 15A, the guide member 14 can be thereby displaced in the directions orthogonal to the contact surfaces 14C with respect to the locking device 13.

As illustrated in FIG. 7, a spring 16 is provided on one side of the guide member 14 remote from the contact surfaces 14C in the displacement directions of the guide member 14 (in front-rear directions in FIG. 7), that is on a front-end side of the guide member 14. The spring 16 is an elastic element that applies an elastic force to the guide member 14 against a pressing force acting on the contact surfaces 14C.

The pressing force acting on the contact surfaces 14C is a reaction force that is produced when a user pushes the wheeled platform 10 toward the wall 4 to secure the wheeled platform 10 using the striker 2 and the contact surfaces 14C impact on the wall 4.

Thus, the guide member 14 according to the present embodiment is configured such that, when the post 12 approaches the striker 2, the contact surfaces 14C come first into contact with the wall 4. Specifically, the guide member 14 is configured such that the contact surfaces 14C are located at a rearmost end in any displacement state of the guide member 14.

<2.3 Unlocking Device>
<Overview of Unlocking Device>

The unlocking device 20 is a device for switching of the locking state of the locking device 13 to the non-locking state. As illustrated in FIG. 3, the unlocking device 20 comprises operation cables 21 and a device body 22.

The operation cable 21 transmits an operational force to the locking device 13. The operational force is applied when the user operates the device body 22. The operation cable 21 according to the present embodiment is a pull-type operation cable that transmits only a pull force.

In the present embodiment, when the operational force is transmitted to the locking device 13 through the operation cable 21, the locking device 13 enters the non-locking state from the locking state. Furthermore, when the locking device 13 is pressed toward the striker 2 and the striker 2 is engaged with the latch 13B, the locking device 13 applies a pull force to the operation cable 21.

Figure 10:
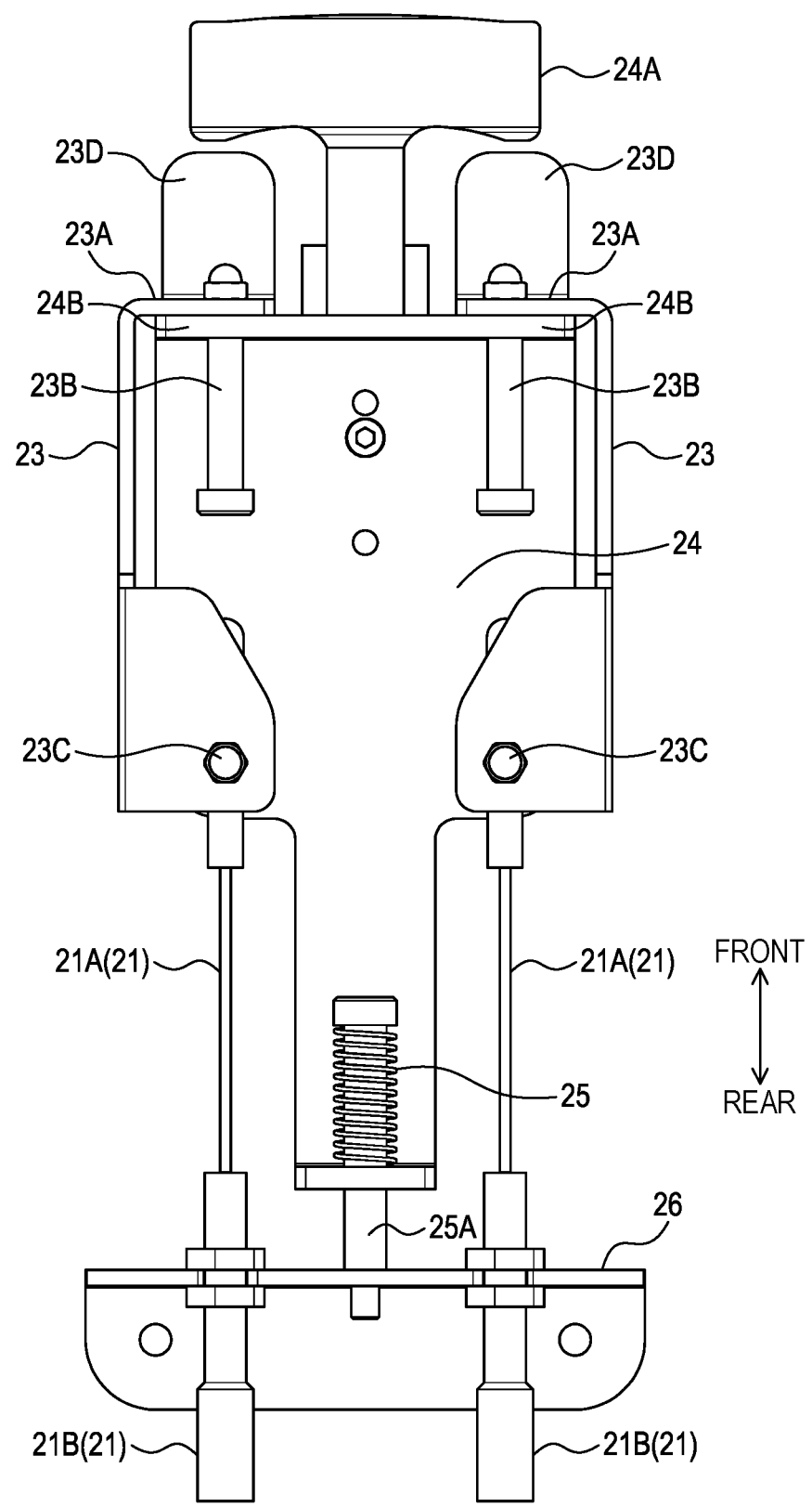
FIG. 10 is a diagram illustrating an unlocking device according to the first embodiment.

In the present embodiment, one operation cable 21 is coupled to one locking device 13. In addition, two device bodies 22 are provided and two operation cables 21 are connected to each device body 22 in the present embodiment as illustrated in FIG. 10.

Among the two operation cables 21 connected to the device body 22, a first operation cable 21 is connected to the locking device 13 on the lower-end side of the post 12, and a second operation cable 21 is connected to the locking device 13 on an upper-end side of the same post 12.

<Details of Device Body>

Figure 11:
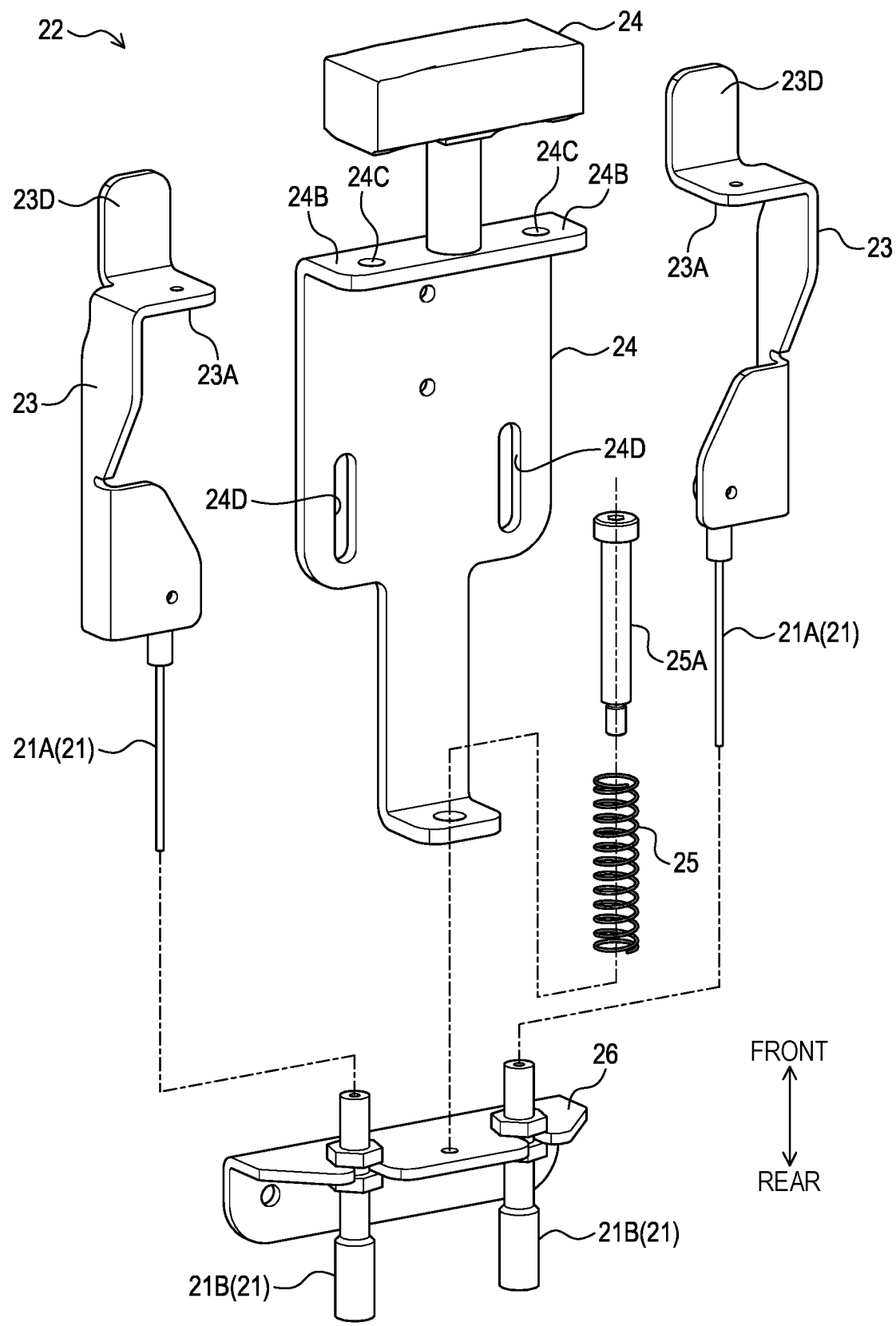
FIG. 11 is a diagram illustrating an exploded view of the unlocking device according to the first embodiment.

As illustrated in FIG. 11, the device body 22 comprises at least two interlocked displacement members 23, an operation member 24, a spring 25 and a cable holder 26. Each displacement member 23 is displaced in conjunction with the state of the locking device 13.

<Interlocked Displacement Member and Cable Holder>

To each interlocked displacement member 23, an inner cable 21A of the operation cable 21 is coupled. Each interlocked displacement member 23 is displaceable between a first locking position corresponding to the locking state and a first non-locking position corresponding to the non-locking state.

In other words, when the interlocked displacement member 23 is at the first locking position, the locking device 13 corresponding to the interlocked displacement member 23 is in the locking state; and when the interlocked displacement member 23 is at the first non-locking position, the locking device 13 corresponding to the interlocked displacement member 23 is in the non-locking state.

Figure 12:
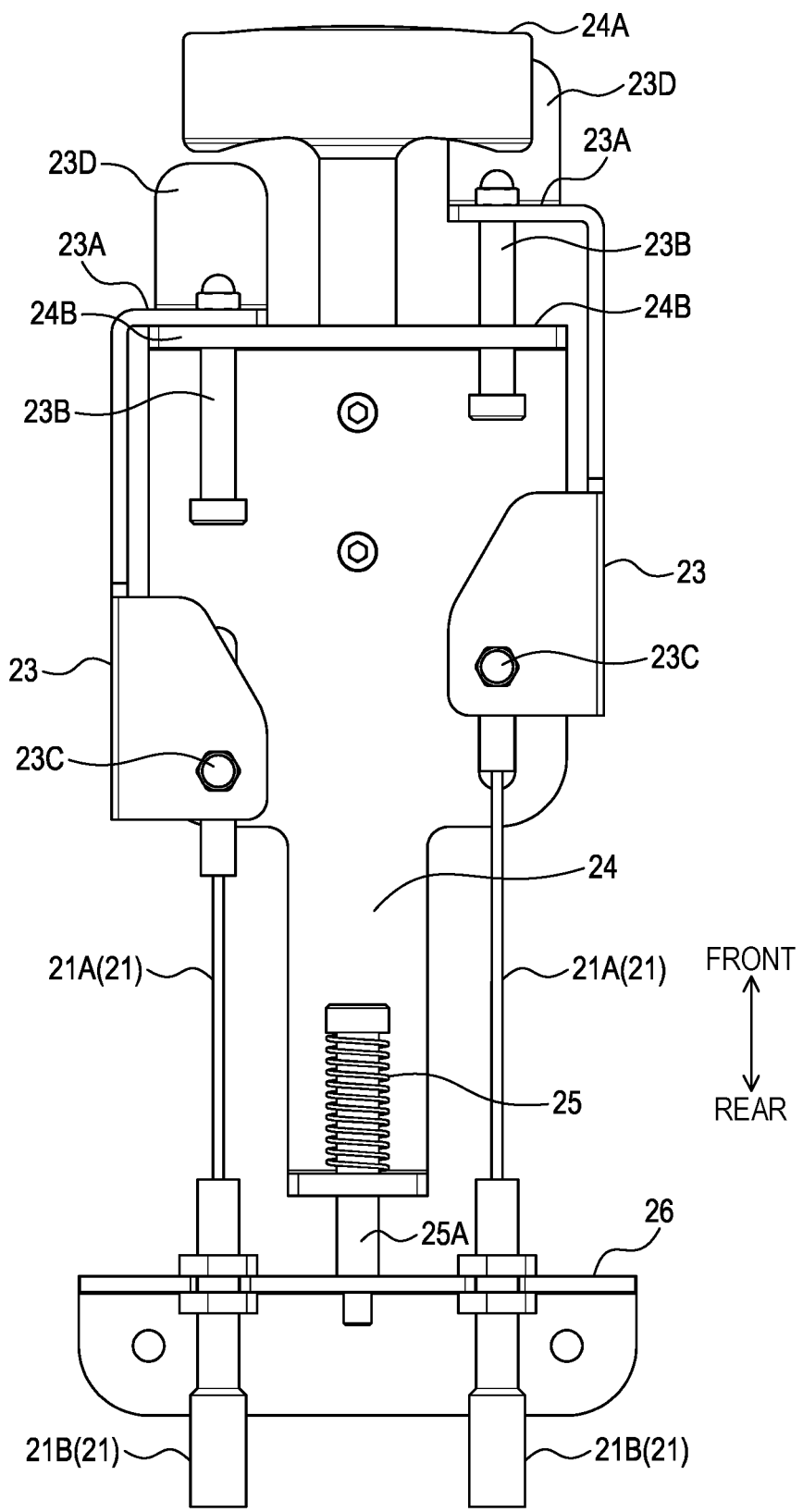
FIG. 12 is a diagram illustrating the unlocking device according to the first embodiment.

The first locking position refers to, for example, a position of the interlocked displacement member 23 arranged on a left side in a plane of FIG. 12. The first non-locking position refers to, for example, a position of the interlocked displacement member 23 arranged on a right side in the plane of FIG. 12.

In other words, the interlocked displacement member 23 when at the first locking position is located closer to the cable holder 26 than when at the first non-locking position. The cable holder 26 is a bracket holding an outer casings 21B of the operation cables 21. The cable holder 26 is secured to the base 11.

<Operation Member and Spring>

The operation member 24 is a member operated by the user. The operation member 24 is displaceable between a second locking position (see FIGS. 10 and 12) correspond-ing to the locking state and a second non-locking position (see FIG. 13) corresponding to the non-locking state.

The operation member 24 is displaceably supported by a rail member (not shown) provided on the base 11. Each interlocked displacement member 23 is displaceably supported by the operation member 24 in a manner displaceable with respect to the operation member 24.

Specifically, each interlocked displacement member 23 is coupled to the operation member 24 by bolts 23B, 23C as illustrated in FIG. 12. The bolt 23B is penetrated in a through hole 24C (see FIG. 11) provided on the operation member 24. The bolt 23C is penetrated in an elongated through hole 24D (see FIG. 11) provided on the operation member 24.

The bolt 23B is slidable in penetration directions of the through hole 24C with respect to the operation member 24. The bolt 23C is slidable with respect to the operation member 24 in major-axis directions of the through hole 24D. The penetration directions of the through hole 24C are parallel to the major-axis directions of the through hole 24D. Accordingly, the interlocked displacement member 23 can be displaced in the major-axis directions of the through hole 24D with respect to the operation member 24.

The spring 25 is configured such that an amount of elastic deformation thereof increases as the operation member 24 is displaced from the second locking position to the second non-locking position. In other words, the spring 25 applies an elastic force to the operation member 24 to thereby displace the operation member 24 toward the second locking position.

Accordingly, when no operational force is acting on the operation member 24, the operation member 24 is at the second locking position (see FIGS. 10 and 12). The operation member 24 is provided with a manipulation handle 24A and a spring bolt 25A.

The manipulation handle 24A can be held by the user. The spring bolt 25A penetrates the spring 25 and the operation member 24, and a threaded portion of the spring bolt 25A is fastened to the cable holder 26. Thus, as the operation member 24 approaches the cable holder 26, the spring 25 is elastically deformed.

When the operation member 24 at the second locking position receives the operational force and thereby is displaced to the second non-locking position, the operation member 24 transmits the operational force to at least one of the interlocked displacement members 23 to displace the interlocked displacement member(s) 23 to the first non-locking position.

Figure 13:
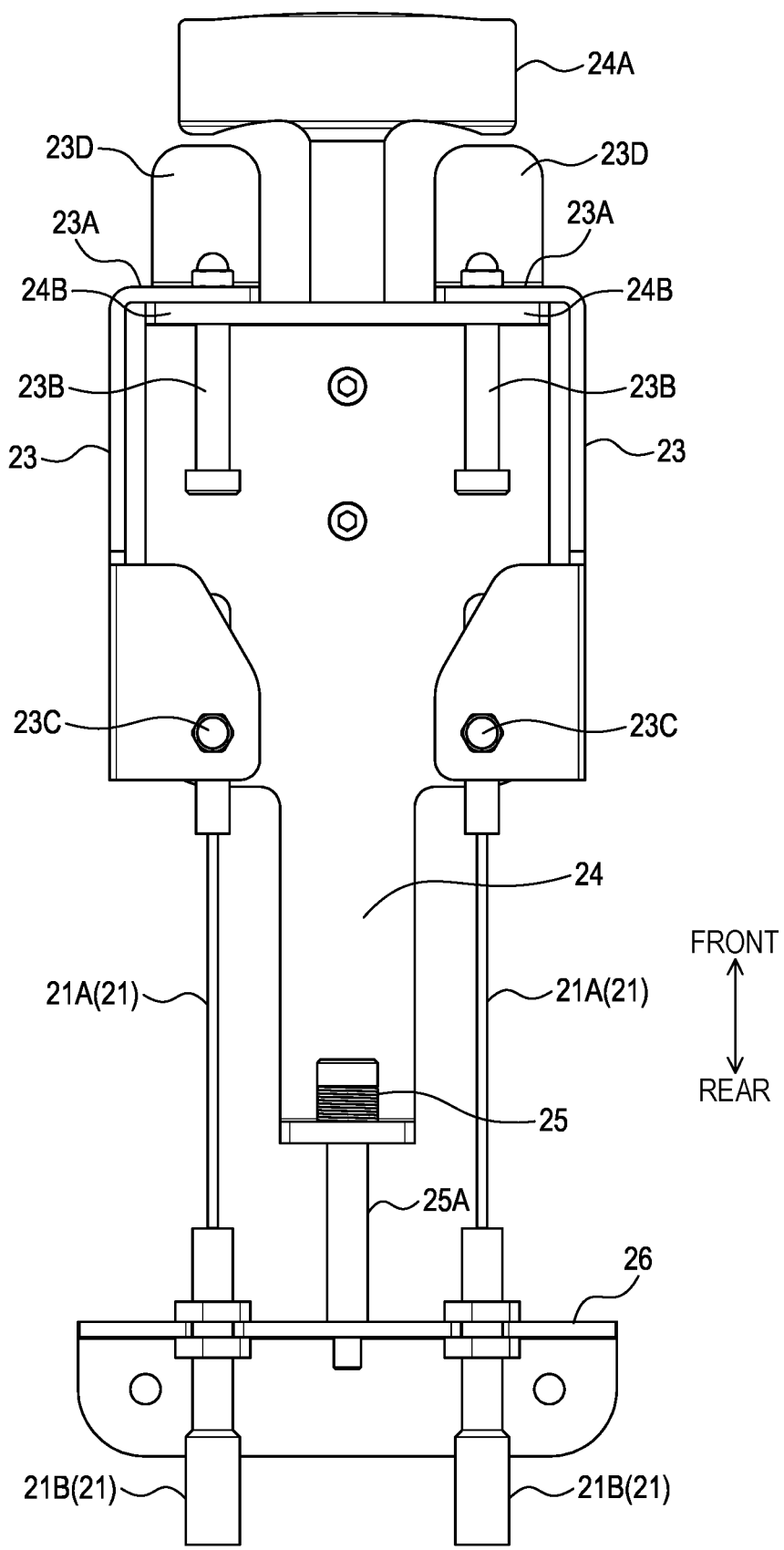
FIG. 13 is a diagram illustrating the unlocking device according to the first embodiment.

In other words, when the operation member 24 at a position illustrated in FIG. 10 receives the operational force, the operation member 24 is displaced to a position illustrated in FIG. 13 and displaces the two interlocked displacement members 23 to the first non-locking position illustrated in FIG. 13.

Specifically, each interlocked displacement member 23 is provided with a contact portion 23A, and the operation member 24 is provided with contact portions 24B (see FIG. 11). The contact portions 23A, 24B are portions that come into contact with each other to transmit the operational force to the interlocked displacement members 23 when the operation member 24 receives the operational force and thereby is displaced from the second locking position toward the second non-locking position.

<Indicator>

The unlocking devices 20 according to the present embodiment are arranged on a bottom surface side of the base 11 (see FIG. 3). Thus, it is not easy for the user to visually check in which positions between the first locking position and the first non-locking position the interlocked displacement members 23 are positioned.

Thus, the interlocked displacement members 23 according to the present embodiment are each provided with an indicator 23D. The indicator 23D is a portion that becomes visible to the user when the interlocked displacement member 23 is at the first non-locking position.

Specifically, when the interlocked displacement member 23 is at the first non-locking position, at least part of the indicator 23D is positioned outside of an outer edge of the base 11. Thus, the user can see the indicator 23D when the interlocked displacement member 23 is at the first non-locking position.

<3. Features of Wheeled Platform of Present Embodiment>
<3.1 Regarding Guide Portion, Etc.>

In the wheeled platform 10 according to the present embodiment, the guide member 14 and the spring 16 function as a shock absorber that absorbs an impact force produced when the wheeled platform 10 is secured to the wall 4. This can inhibit a great impact force from acting on the wheeled platform 10 and the article placed on the wheeled platform 10.

In addition, the contact surfaces 14C of the guide member 14 are provided at such positions where the contact surfaces 14C come first into contact with the wall 4 when the post 12 approach the striker 2. This can ensure that the guide member 14 and the spring 16 function as a shock absorber.

In addition, since the spring 16 is configured to apply an elastic force to the wheeled platform 10 in a direction in which the wheeled platform 10 is moved away from the wall 4, the elastic force provides a function to assist in easy release of the wheeled platform 10 engaged with the striker 2.

Furthermore, the guide member 14 guides the striker 2 to the engagement portion of the locking device 13. This ensures engagement of the striker 2 with the locking device 13.

<3.2 Regarding Unlocking Device>

When the locking device 13 is in the locking state, as illustrated in FIG. 10, the interlocked displacement members 23 are at the first locking position and the operation member 24 is at the second locking position. In the locking state, when the operational force is applied and the operation member 24 is thereby displaced to the second non-locking position, the interlocked displacement members 23 are displaced to the first non-locking position in conjunction with the displacement of the operation member 24 (see FIG. 13).

This unlocks the locking devices 13 corresponding to the interlocked displacement members 23 which have been displaced to the first non-locking position. In this state, when the operational force is lost, the operation member 24 returns to the second locking position due to the elastic force of the spring 25 (see FIG. 12).

Then, if the locking device 13 enters the locking state, the interlocked displacement member 23 is displaced to the first locking position as shown with the left interlocked displacement member 23 in FIG. 12. If the locking device 13 remains in the non-locking state, the interlocked displacement member 23 is located at the first non-locking position as shown with the right interlocked displacement member 23 in FIG. 12.

This can enable the user to know whether the locking device 13 is in the locking state or the non-locking state by understanding a relationship between the position of the interlocked displacement members 23 and the position of the operation member 24.

In addition, the indicator 23D is provided which becomes visible to the user when the interlocked displacement member 23 is at the first non-locking position. This can enable the user to see the indicator 23D when the interlocked displacement member 23 is at the first non-locking position.

Other Embodiments

The wheeled platform 10 according to the above-described embodiment comprises four locking devices 13. However, the present disclosure is not limited to this configuration. Specifically, the wheeled platform 10 according to the present disclosure may comprise, for example, at least one locking device 13.

The unlocking device 20 according to the above-described embodiment is configured such that one unlocking device 20 can unlock two or more locking devices 13. However, the present disclosure is not limited to this configuration. Specifically, the unlocking device 20 according to the present disclosure may be configured, for example, such that one unlocking device 20 unlocks one locking device 13, in other words the device body 22 may comprise one interlocked displacement member 23.

The unlocking device 20 according to the above-described embodiment comprises the indicators 23D. However, the present disclosure is not limited to this configuration. Specifically, the unlocking device 20 according to the present disclosure may be configured, for example, such that the indicators 23D are omitted.

The interlocked displacement members 23 of the unlocking device 20 according to the above-described embodiment are displaceably coupled to the operation member 24. However, the present disclosure is not limited to this configuration. Specifically, the interlocked displacement members 23 according to the present disclosure may be, for example, displaceably coupled to the base 11.

Furthermore, the present disclosure is not limited to the above-described embodiments, but may be implemented in various forms within the scope of the subject matter of the present disclosure recited in the claims. Accordingly, two or more embodiments may be combined, and some of the elements illustrated in the drawings or described with reference to assigned reference numerals in the above-described embodiments may be omitted.

What is claimed is:

1. A wheeled platform engageable with a striker secured to a wall-shaped portion, the wheeled platform comprising:
    a base for an article to be placed thereon;
    a columnar post rising from the base;
    a locking device arranged in the post to be engageable with the striker in a manner such that the locking device holds the striker inside thereof;
    a guide member configured to guide the striker to an engagement portion of the locking device in a state where the post approaches the striker, the guide member comprising a contact surface configured to be in contact with the wall-shaped portion in a state where the striker is engaged with the locking device, the guide member being displaceable in directions orthogonal to the contact surface,
    wherein the guide member includes opposing inclined surfaces that converge towards each other as the opposing inclined surfaces extend inwardly from the contact surface of the guide member, and wherein the guide member includes a recess having an open side extending inwardly from the opposing inclined surfaces and a closed side of the recess provided opposite the open side; and a spring configured to apply an elastic force to the guide member against a pressing force acting on the contact surface.

2. The wheeled platform according to claim 1, wherein the locking device and the guide member are arranged on a base side of a longitudinally intermediate portion of the post, each of the locking device and the guide member being at least one in number.

3. The wheeled platform according to claim 1, wherein the contact surface is arranged at a position so that the contact surface comes first into contact with the wall-shaped portion in a state where the post approaches the striker.

4. The wheeled platform according to claim 2, wherein the contact surface is arranged at a position so that the contact surface comes first into contact with the wall-shaped portion in a state where the post approaches the striker.

5. A wheeled platform locking system comprising:
   a striker secured to a wall-shaped portion; and
   a wheeled platform engageable with the striker, the wheeled platform comprising:
     a base for an article to be placed thereon;
     a columnar post rising from the base;
     a locking device arranged in the post, the locking device being engageable with striker in a manner such that the locking device holds the striker inside thereof;
     a guide member configured to guide the striker to an engagement portion of the locking device in a state where the post approaches the striker, the guide member comprising a contact surface configured to be in contact with the wall-shaped portion in a state where the striker is engaged with the locking device, the guide member being displaceable in directions orthogonal to the contact surface,
   wherein the guide member includes opposing inclined surfaces that converge towards each other as the opposing inclined surfaces extend inwardly from the contact surface of the guide member, and wherein the guide member includes a recess having an open side extending inwardly from the opposing inclined surfaces and a closed side of the recess provided opposite the open side; and
   a spring configured to apply an elastic force to the guide member against a pressing force acting on the contact surface.

* * * * *